United States Patent [19]
Fukushima et al.

[11] Patent Number: 4,857,952
[45] Date of Patent: Aug. 15, 1989

[54] EXPOSURE MEMBER DRIVE CONTROL DEVICE

[75] Inventors: Nobuo Fukushima; Tadashi Okino; Shinji Sakai, all of Kanagawa, Japan

[73] Assignee: Canon Kabushiki Kaisha

[21] Appl. No.: 27,997

[22] Filed: Mar. 17, 1987

Related U.S. Application Data

[63] Continuation of Ser. No. 906,583, Sep. 9, 1986, abandoned, which is a continuation of Ser. No. 756,062, Jul. 17, 1985, abandoned.

[30] Foreign Application Priority Data

Jul. 23, 1984 [JP] Japan ............................. 59-152359
Jul. 23, 1984 [JP] Japan ............................. 59-152360

[51] Int. Cl.$^4$ ........................... G03B 7/00; G05D 3/00
[52] U.S. Cl. .................................... 354/452; 354/456; 318/466; 318/685
[58] Field of Search ............... 354/400, 401, 435–440, 354/451, 452, 453, 456, 458, 202, 226, 228, 230, 232, 234.1, 235.1, 250, 289.1, 289.12, 258.1, 272, 254, 271.1; 352/204, 208, 216, 217, 91 R, 91 C, 91 S; 318/466, 467, 468, 685

[56] References Cited

U.S. PATENT DOCUMENTS

| 4,299,459 | 10/1981 | Mizokami | 354/452 |
| 4,322,144 | 3/1982 | Suzuki et al. | 354/453 |
| 4,423,937 | 1/1984 | Suzuki et al. | 354/446 |

FOREIGN PATENT DOCUMENTS

| 56-138270 | 10/1981 | Japan . | |
| 82228 | 5/1983 | Japan | 354/452 |
| 111023 | 7/1983 | Japan | 354/439 |

Primary Examiner—W. B. Perkey
Attorney, Agent, or Firm—Toren, McGeady & Associates

[57] ABSTRACT

Control device for controlling the driving motion of an exposure member, such as a diaphragm or shutter, so as to variably control the aperture opening thereof, wherein a particular value for the diaphragm or shutter is determined and the diaphragm or shutter is set to the determined value, and if the determined value is detected by a detector while the diaphragm or shutter is in the initial state, the diaphragm or shutter is initially driven in the opening or closing direction.

37 Claims, 3 Drawing Sheets

EXPOSURE MEMBER DRIVE CONTROL DEVICE

This is a continuation of application Ser. No. 906,583, filed Sept. 9, 1986, now abandoned, which in turn is a continuation of application Ser. No. 756,062, filed July 17, 1985, now abandoned.

BACKGROUND OF THE INVENTION

1. Field of the Invention

The present invention relates to exposure member drive control devices for controlling the variation of a diaphragm or shutter, and, more particularly, to a diaphragm drive control device for setting the diaphragm to a particular aperture value, and a rotary shutter drive control device for controlling the angle of opening of a rotary shutter.

2. Description of the Prior Art

When the variation of the size of aperture opening of the diaphragm is electrically controlled, the diaphragm must be initially set to a particular aperture value. For the initial setting purpose, the diaphragm is usually provided with a switch for detecting when its aperture size takes the particular value. If there is no detection output in the initial state, the diaphragm is driven to move toward either a maximum or a minimum value, and then stopped from further movement when the detection switch detects the particular aperture value. Thus, the diaphragm is set in an initial position.

Also, if there is a detection output in the initial state, the diaphragm is assumed to have the particular aperture value, permitting the subsequent operations to go on.

However, if the detection switch malfunctions, the initial presence of the detection output does not insure that the diaphragm is already set in the initial position of the particular aperture value, and the occurrence of the malfunction of the detection switch cannot be checked. Such problems have arisen even when the rotary shutter is set to the initial position.

SUMMARY OF THE INVENTION

An object of the present invention is to eliminate the above-described problems and to provide an improved exposure member drive control device.

Another object of the invention is to provide a diaphragm drive control device which enables the diaphragm to be set in an initial position of a particular aperture value with high reliability.

Still another object of the invention is to provide a diaphragm drive control device capable of informing that the means for detecting the particular aperture value malfunctions.

Another object of the invention is to provide a rotary shutter drive control device which enables the rotary shutter to be set in an initial position of a particular value of opening angle with high reliability.

Still another object of the invention is to provide a rotary shutter control device capable of informing that the means for detecting the particular value of opening angle malfunctions.

To accomplish these objects, in an embodiment of the invention, the device for controlling the driving motion of a diaphragm to variably control the size of aperture opening thereof is provided with means for detecting when the aperture size takes a particular value and means for setting the diaphragm to the particular aperture value, wherein the setting means is responsive to that output of the detecting means which represents the fact that the diaphragm is previously set in an initial position where the aperture size has the particular value, for taking the diaphragm out of the previous setting in the initial position and then bringing it back thereto. Thus it is made possible to determine whether or not the detecting means malfunctions and to provide assurance of setting the diaphragm in the initial position.

According to another embodiment of the invention applied to a rotary shutter drive control device, if the angle of opening of the rotary shutter has a particular value sensed by the detecting means when the device is rendered operative, the setting means preliminarily drives motion of the rotary shutter in a direction either to open or close, thus is made possible to determine whether or not the detecting means malfunctions at a time when the rotary shutter is set to the initial position and to provide assurance of setting the shutter in the initial position.

Other objects, features and advantages of the invention will become apparent from the following description of embodiments thereof by reference to the accompanying drawings in which:

DETAILED DESCRIPTION OF THE PREFERRED EMBODIMENTS

Figure 1:
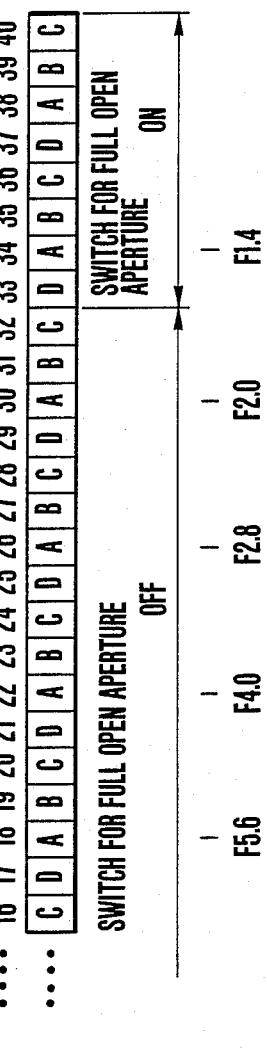
FIG. 1 is a diagram illustrating the relationship between each phase of a stepping motor for driving a diaphragm and an aperture value in a first embodiment of the invention.

In FIG. 1, the phases of the stepping motor are labelled with numerals numbered consecutively in a direction to increase the size of aperture opening of the diaphragm. The stepping motor used herein has four different phases A, B, C and D. When the motor is supplied with driving pulses in the order of A→B→C→D, the diaphragm is driven to open. When in the reversed order, closing of it results. In this embodiment, the detecting means is in the form of a switch arranged to close when the size of aperture opening of the diaphragm takes largest values as related by the 33rd and higher phases. For the 32nd and lower phases, the switch is open.

Whether or not the switch is open is checked at each A phase, and, as the one of the A phases which is numbered 34 has an F-number of 1.4, the corresponding position of the diaphragm to the 34th phase is taken as a "full open aperture" position. For note, though the switch is arranged to change between the open and closed positions at a time between the 32nd and 33rd phases, in order to compensate for the mechanical lag of the switch, the checking is carried out at the 34th phase.

It is also to be noted that though such an aperture value as substantially full open is formed in the 34th phase, the diaphragm is constructed to be movable beyond this position by taking into account a possibility of occurrence of a malfunction of the full open aperture detecting switch which allows for the step motor to drive motion of the diaphragm beyond that position.

Figure 2:
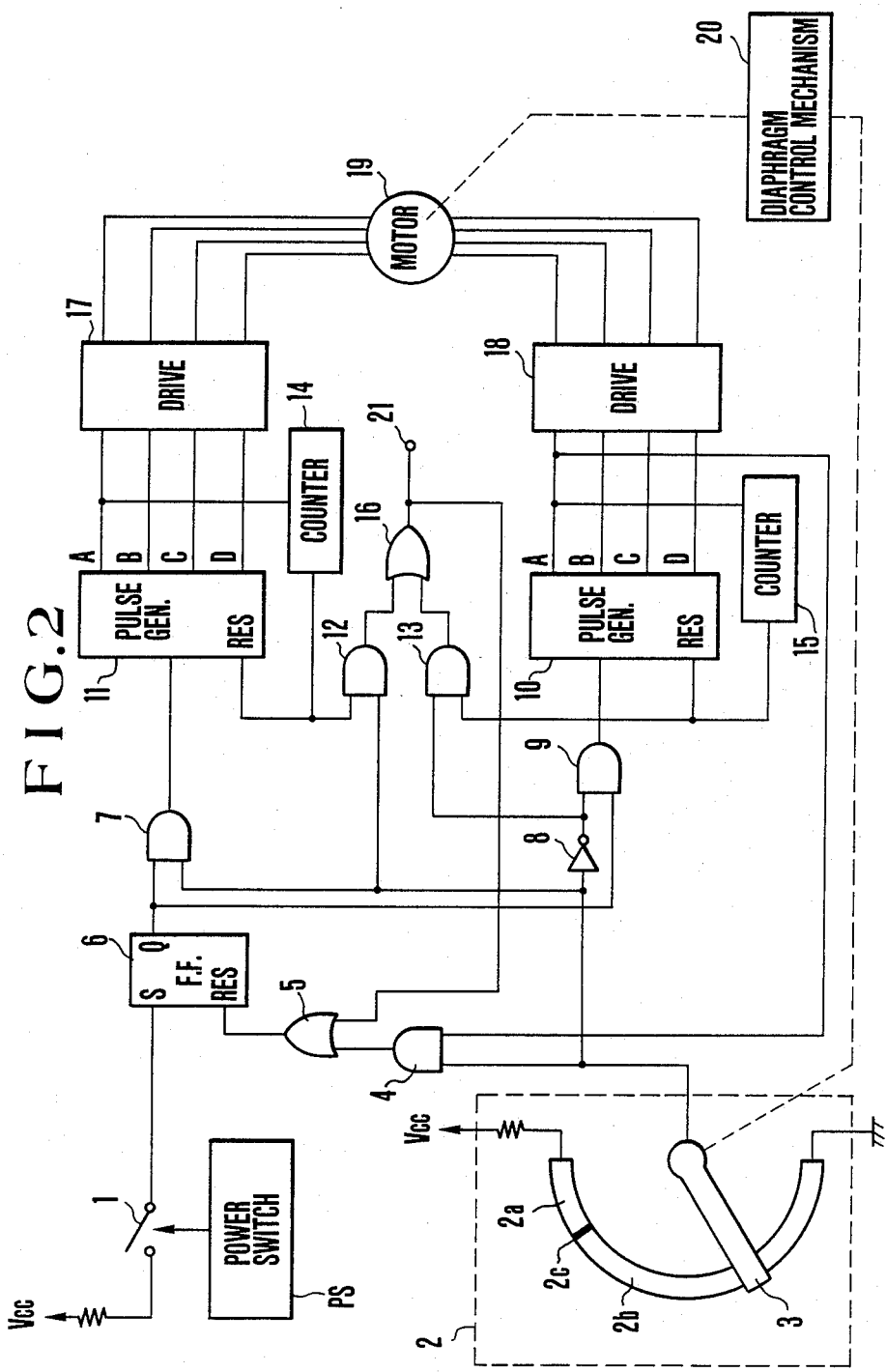
FIG. 2 is an electrical circuit diagram of the first embodiment of the device according to the invention.

A control circuit of FIG. 2 includes an initial setting switch 1, and a full open aperture detecting switch 2. The switch 2 is constructed with an arcuate electrically conductive patch 2a connected to a voltage source Vcc, another arcuate electrically conductive patch 2b connected to a circuit ground, an electrically insulated boundary 2c between the patches 2a and 2b, and a pivotal slider 3 operatively connected to a diaphragm drive mechanism 20. The circuit further includes AND gates 4, 7, 9, 12 and 13, OR gates 5 and 16, a flip-flop 6, an inverter 8, a first driving pulse generator 10 having four output stages A, B, C and D at which pulses appear successively in this order so that the diaphragm is opening, a second driving pulse generator 11 having four output stages A, B, C and D at which pulses appear successively in the reversed order so that the diaphragm is closing, a first counter 14 receptive of the pulses of A phase from the generator 11 and responsive to attainment of the counted pulse number to $N_1$ for producing an output signal, a second counter 15 receptive of the pulses of A phase from the generator 10 and responsive to attainment of the counted pulse number to $N_2$ for producing an output signal, drivers 17 and 18 for a stepping motor 19 and an outlet 21 at which appears a warning signal representing the occurrence of a malfunction. PS is a power switch.

The operation of the device is as follows: When the power switch PS turns on, and the initial setting switch 1 turns on, the output of the flip-flop 6 becomes high level. Now assuming that the lever 3 lies on the second patch 2b, or the diaphragm is not set in the initial position where the aperture is fully open, then the output of the AND gate 9 becomes high level, triggering the first pulse generator 10. Responsive to a series of successive driving pulses, the stepping motor 19 drives the diaphragm to open. Soon after the lever 3 has transferred to the patch 2a, at a time when a first pulse of A phase is produced, the output of the AND gate 4 becomes high level, thereby the flip-flop 6 is reset. Thus, the diaphragm is set to the initial position at full open aperture.

Suppose the flip-flop 6 is not reset even after $N_2$ pulses of A phase have been produced, a judgment is made that the switch 2 or the diaphragm drive mechanism 20 malfunctions, causing the output of the second counter 15 to change to high level. The pulse generator 10 is then reset to stop the driving of the diaphragm. Responsive to this, the AND gate 13 produces a warning signal which appears at the outlet 21.

Alternatively assuming that the lever 3 lies on the first patch 2a or the diaphragm is at full open aperture at a time when the switch 1 is closed, then the output of the AND gate 7 becomes high level. Thereby the second pulse generator 11 is triggered, producing a train of pulses. Therefore, the diaphragm is taken out of the full open aperture position.

Then when the lever 3 transfers to the second patch 2b, the output of the switch 2 changes to low level. Responsive to this, the AND gate 7 produces an output of low level which is applied to reset the second pulse generator 11, and, at the same time, the AND gate 9 produces an output of high level which is applied to actuate the first pulse generator 10. Therefore, the diaphragm returns back to the full open aperture position. After the output of the switch 2 has changed to high level, when the first pulse generator 10 produces a first pulse of A phase, the AND gate 4 produces an output of high level which is applied through the OR gate 5 to reset the flip-flop 6. Thus, the setting operation of the diaphragm to the initial or full open aperture position is terminated.

It is to be noted here that during the time when the diaphragm is closing, the counter 14 counts pulses of A phase. When the number of pulses counted reaches $N_1$, the pulse generator 11 is reset. Suppose the output of the switch 2 remains high level despite the diaphragm has moved $N_1$ steps in the closing direction, the operation of the switch 2 is taken as abnormal. The output of the OR gate 16 then changes to high level. This is applied as a warning signal to the outlet 21 and therefrom to a display device (not shown) such as a loud speaker. The output of the OR gate 16 is also applied through the OR gate 5 to reset the flip-flop 6.

Also during the time when the diaphragm is opening, the counter 15 receives pulses of A phase. Suppose the output of the switch 2 is left unchanged to high level even after $N_2$ pulses have been counted, the output of the pulse generator 10 is stopped and a warning signal appears at the outlet 21.

This warning signal is also applied to the OR gate 5 and therefrom to the flip-flop 6. Thus, the initial setting operation is interrupted.

What values should be given to the pulse numbers $N_1$ and $N_2$ for the pulse counters 14 and 15 depends upon the particular aperture value at which the switch 2 changes over between ON and OFF states. In the case of FIG. 1, $N_1$ may take, for example, 3 to 10, and $N_2$, for example, 9.

It will be understood that even when the full open aperture detecting switch produces the output of high level at the start of a setting operation, the diaphragm is preliminarily moved away from the initial position. Therefore, the operator can make sure the diaphragm is set just in the initial position. If there is a malfunction of the switch 2, he will be informed by the warning signal, and the current supply to the stepping motor is soon cut off to protect the mechanism from damages.

Though the foregoing embodiment has been described in connection with the use of the high level of the output of the switch 2 in detecting the full open aperture, the device may be otherwise constructed so that the low level is used for detecting the full open aperture.

Also though, in this embodiment, the diaphragm is initially set in the full open aperture value, it is possible to take the initial position at the smallest size of aperture opening, or an intermediate one.

It is also possible to realize these operations by using a microcomputer.

Figure 3:
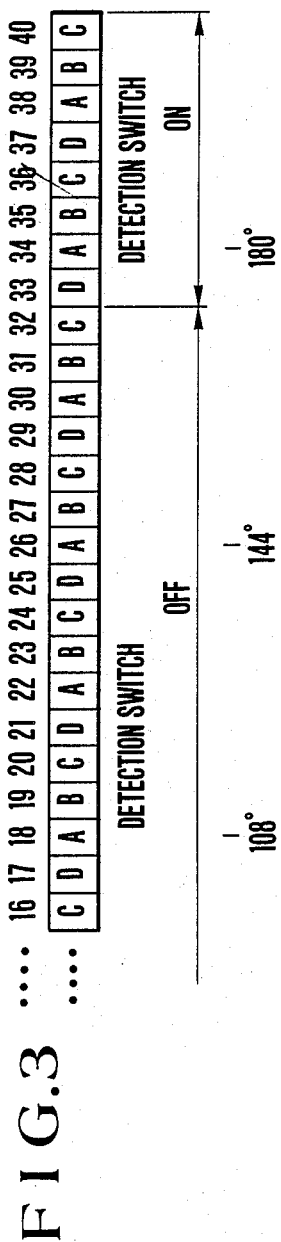
FIG. 3 is a diagram illustrating the relationship between each phase of a stepping motor for driving a rotary shutter and an angle of opening thereof in a second embodiment of the invention.

A second embodiment of the invention will next be described as applied to a rotary shutter drive control device. FIG. 3 is a chart of driving pulses of A, B, C and D phases for the stepping motor related to the values of the opening angle of the rotary shutter. When the motor is supplied with the pulses in the order: A→B→C→D, the opening angle increases, and when in the reversed order: D→C→B→A, it decreases. In this embodiment, the detecting means is in the form of a switch arranged to detect when the opening angle takes a maximum value. For the 32nd and lower phases, the switch is OFF, and for the 33rd and higher phases, it is ON. The position of the switch is checked in synchronism with the A phase. At the 34th phase, the opening angle has 180°. This position is taken as a maximum opening angle position. In more detail, though the detecting switch changes over between ON and OFF states at a time between the 32nd and 33rd phases, the checking of the switch is carried out at the 34th phase by taking into account a time lag due to the looseness of the mechanical parts.

It is also to be noted that these is no need to use the pulses that follow the 34th one. But, if the stepping motor or the detecting switch malfunctions, the diaphragm will be forced to overrun the limit of the dynamic range with a result of damage. To avoid this, the rotary shutter is constructed so as to be movable safely up to a corresponding position to the 40th phase.

Figure 4:
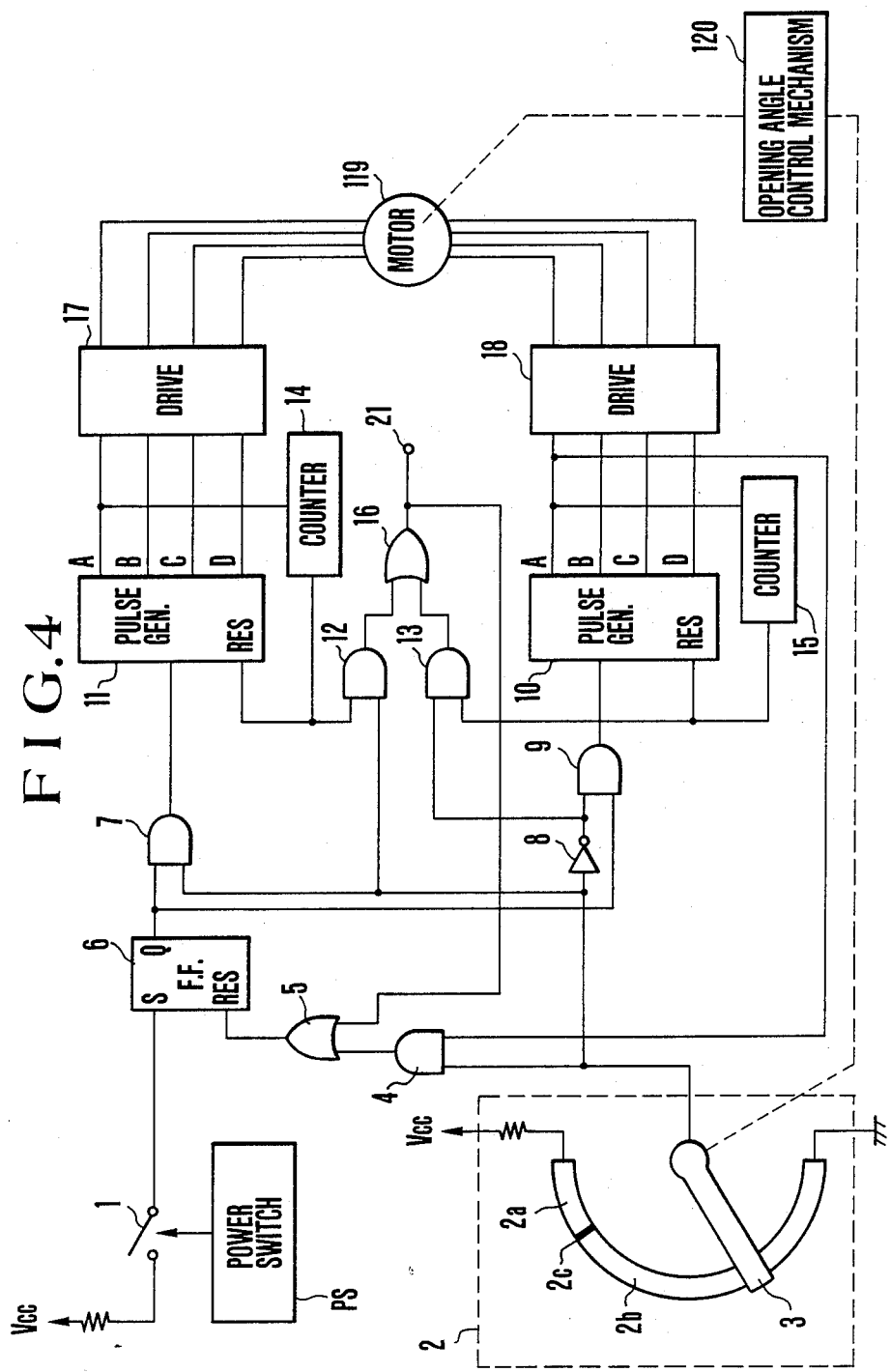
FIG. 4 is an electrical circuit diagram of the second embodiment of the device according to the invention.

A control circuit of FIG. 4 is different from that of FIG. 2 in that 119 is an opening angle control stepping motor, and 120 is an opening angle control mechanism operatively connected to the detecting switch lever 3.

The operation of the device of FIGS. 3 and 4 is as follows: The operator will first turn on the power switch PS, thereby a current supply to the opening angle control device is started. In automatic response thereto, the switch 1 is turned on.

Now assuming that the lever 3 points to the second patch 2b, or the rotary shutter is not set in the initial position yet, then the AND gate 9 produces an output of high level. Responsive to this, the first pulse generator 10 produces a train of pulses. Therefore, the opening angle is increasing. Then when the lever 3 transfers to the first patch 2a, the output of the AND gate 4 changes to high level in synchronism with the first pulse of A phase, thereby the flip-flop 6 is reset. Thus, the setting operation of the rotary shutter to the initial position is completed.

Alternatively assuming that the lever 3 lies on the first patch 2a or the rotary shutter is already set in the initial position at the maximum opening angle when a setting operation starts, then the second pulse generator 11 is triggered. As the shutter is moving with decreasing angles of the opening, when the lever 3 transfers to the second patch 2b, the pulse generator 11 is reset, and, at the same time, the other pulse generator 10 is triggered. The shutter is then returned to the initial position. If the pulse of A phase from the pulse generator 10 coincides with the high level of the output of the switch 2, the setting operation of the rotary shutter to the initial position at the maximum opening angle is terminated.

For note, the automatic resetting operation by the counters 14 and 15 and the warning operation are performed in a similar manner to that described in connection with FIG. 2.

What is claimed is:

1. An exposure member drive control device comprising:
    (a) setting actuator means for producing an actuating signal for setting an exposure member to an initial position;
    (b) detecting means for detecting whether or not said exposure member lies in the prescribed initial position; and
    (c) control means for controlling the exposure member to move the exposure member out of a predetermined position if the signal from the setting actuator means is obtained even when the exposure member is already in the prescribed initial position and then to bring it back to the initial position.
2. A device according to claim 1, wherein said control means moves said exposure member to the prescribed position when the setting actuator means produces the actuating signal and the exposure member is not in the prescribed position.
3. A device according to claim 1, wherein said control means after having moved said exposure member from non-prescribed position to the prescribed position stops the control of said exposure member in this prescribed position.
4. A device according to claim 1, further comprising: warning means responsive to detection of the fact that said exposure member has moved in a prescribed direction by more than a prescribed distance.
5. A device according to claim 4, wherein said warning means stops said exposure member as the warning signal is produced.
6. A diaphragm drive control device for controlling the variation of the area of aperture opening of a diaphragm, comprising detecting means for detecting a particular aperture value of said diaphragm, and setting means for setting said diaphragm to said particular aperture value, wherein when there is a detection output of said detecting means at the start of a setting operation, said setting means preliminarily moves said either in an opening or in a closing direction of said diaphragm.
7. A diaphragm drive control device according to claim 6, wherein said setting means produces a warning output signal when the detection output of said detecting means does not detect said particular aperture despite preliminary motion of predetermined amount of said setting means.
8. A diaphragm drive control device according to claim 6, wherein said setting means after having driven the initial motion drives motion in the direction reverse to that of the initial motion.
9. A rotary shutter drive control device for controlling the variation of the opening angle of a rotary shutter, comprising means for detecting a particular opening angle of said shutter and means for setting said rotary shutter to said particular opening angle, wherein when there is a detection output of said detecting means at the start of a setting motion, said setting means drives preliminary motion of said rotary shutter either in an opening or in a closing direction of said opening angle of said rotary shutter.
10. A rotary shutter drive control device according to claim 9, wherein setting means produces a warning output signal when the detection output of said detecting means does not detect said particular opening angle despite preliminary motion of predetermined amount of said setting means.
11. A rotary shutter drive control device according to claim 9, wherein said setting means after having driven the preliminary motion drives motion, in the direction reverse to that of the preliminary motion.
12. An initial setting method for an exposure member comprising the steps of:
    (a) obtaining an indication signal for initially setting said exposure member;
    (b) displacing said exposure member toward the outside of an initial position when a fact that said exposure member is in the initial position is detected under a condition that said indication signal is obtained; and
    (c) after that, displacing said exposure member again toward the initial position.
13. A method according to claim 12, further comprising the steps of:

(d) detecting whether or not said exposure member reaches the initial position after said exposure member has been displaced toward the initial position; and (e) stopping said exposure member when it is detected that said detecting means reaches its initial position.

14. A method according to claim 13, further comprising the step of:

(f) displacing said exposure member toward the initial position when the fact that said exposure member is not in the initial position is detected under a condition that said indication signal is obtained.

15. A method according to claim 13, further comprising the step of:

(f) producing a warning signal when an amount of displacement of said exposure member in a prescribed direction has reached a prescribed value.

16. A method according to claim 15, further comprising the step of:

(g) stopping the displacement of said exposure member when said warning signal is produced.

17. An exposure member drive control device comprising:

(a) setting indication means for producing an indication signal for setting said exposure member to an initial position;

(b) control means responsive to said indication signal for controlling said exposure member so as to reach a prescribed initial position;

(c) detecting means for detecting movement of said exposure member, and detecting whether said exposure member has reached the initial position; and (d) warning signal forming means for producing a warning signal when a control signal for causing said exposure member to reach the initial position is issued in a predetermined amount from said control means when reaching of the initial position is not detected by said detecting means.

18. A device according to claim 17, wherein said control means responsive to said warning signal stops the control of said exposure member.

19. A device according to claim 17, wherein said control means includes display means responsive to said warning.

20. An exposure control apparatus for moving an exposure member a prescribed amount comprising:

(a) driving means for moving the exposure member;

(b) means for supplying the drive means with a signal to move the exposure member in a prescribed amount;

(c) means for detecting that said exposure member has moved to a prescribed position; and (d) means for changing the condition of said apparatus if and when it is not detected that said exposure member has moved to said prescribed position despite the supply of said signal to the drive means from said supply means.

21. An apparatus according to claim 20, wherein said member is a member for controlling the exposure according to its position.

22. An apparatus according to claim 21, wherein said member is a member for controlling the diaphragm aperture.

23. An apparatus according to claim 22, wherein said detecting means further detects when the shutter opening is at a maximum.

24. An apparatus according to claim 21, wherein said exposure member is a member for controlling shutter opening.

25. An apparatus according to claim 24, wherein said detecting means further detects when the diaphragm aperture is at a maximum.

26. An apparatus according to claim 25, wherein said change means includes means for warning when movement of said exposure member to said prescribed position is not detected.

27. An apparatus according to claim 20, wherein said driving means includes a stepping motor and said exposure member is a member for controlling diaphragm aperture.

28. A member drive control device comprising:

(a) setting actuator means for producing an actuating signal for setting a member to an initial position;

(b) detecting means for detecting whether or not said member lies in the initial position; and (c) control means for controlling the member to move the member out of a predetermined position if the signal from the setting actuator means is obtained even when the member is already in the initial position and then to bring it back to the initial position.

29. A device according to claim 28, wherein said control means moves said member to the predetermined position when the setting actuator means produces the actuating signal and the member is not in the predetermined position.

30. A device according to claim 28, wherein said control means, after having moved said member from a non-predetermined position to the predetermined position, stops the control of said member in this predetermined position.

31. A device according to claim 28, further comprising:

warning means responsive to detection of the fact that said member has moved in a prescribed direction by more than a prescribed distance.

32. A device according to claim 31, wherein said warning means stops said member when the warning signal is produced.

33. An initial setting method for a member comprising the steps of:

(a) obtaining an indication signal for initially setting said member;

(b) displacing said member toward the outside of an initial position when a fact that said member is in the initial position is detected under a condition that said indication signal is obtained; and (c) after that, displacing said member again toward the initial position.

34. A method according to claim 33, further comprising the steps of:

(d) detecting whether or not said member reaches the initial position after said member has been displaced toward the initial position; and (e) stopping said member when it is detected by said detecting means that said member reaches the initial position.

35. A method according to claim 33, further comprising the step of:

(f) displacing said member toward the initial position when the fact that said member is not in the initial position is detected under a condition that said indication signal is obtained.

36. A method according to claim 33, further comprising the step of:
(f) producing a warning signal when an amount of displacement of said member in a prescribed direction has reached a prescribed value.

37. A method according to claim 36, further comprising the step of:
(g) stopping the displacement of said member when said warning signal is produced.

* * * * *